Jan. 5, 1971  C. G. ALLEN  3,552,052
PICTURE FRAME
Filed Feb. 5, 1969  3 Sheets-Sheet 1
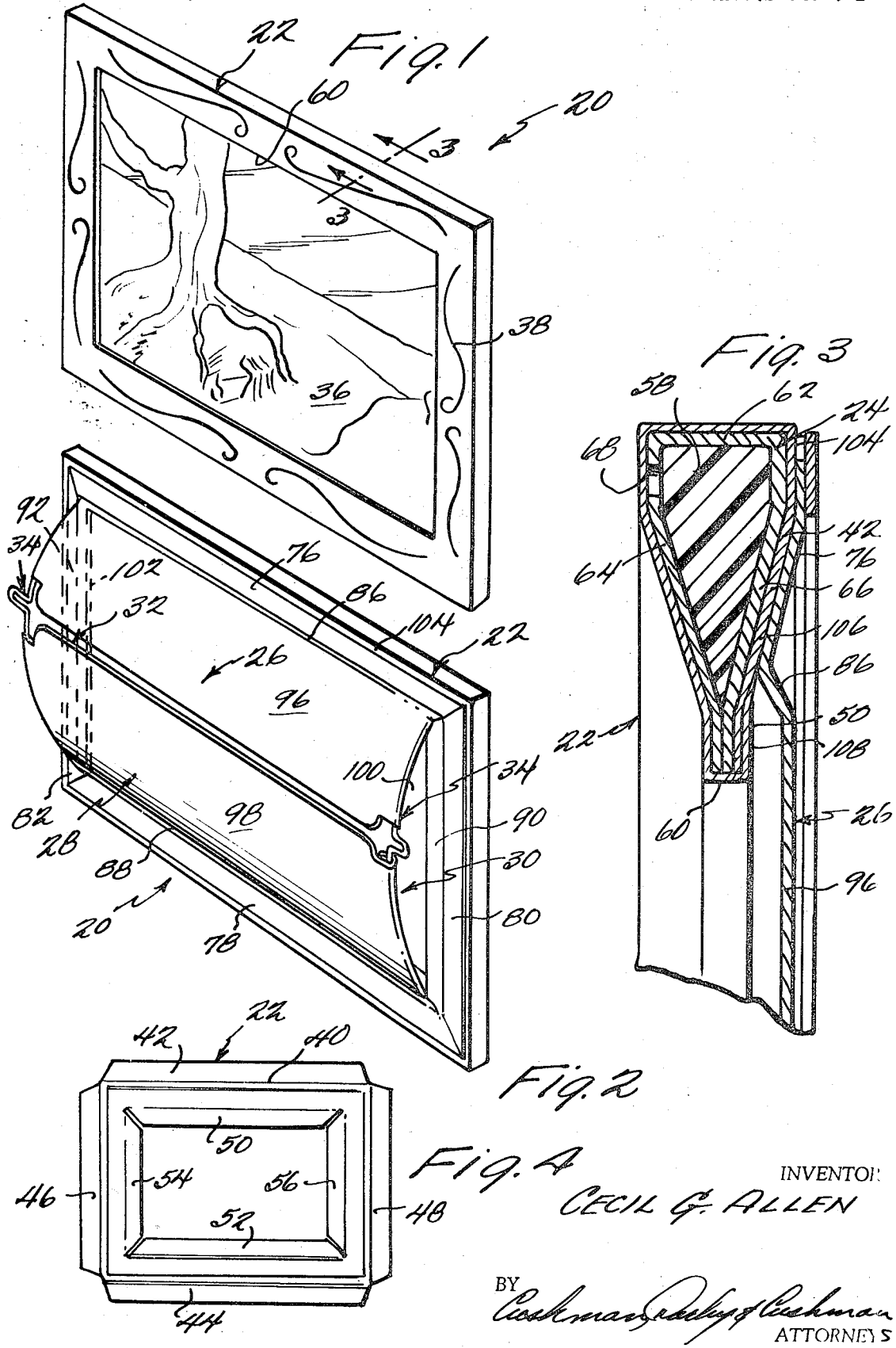
INVENTOR
CECIL G. ALLEN
BY
Cushman Darby & Cushman
ATTORNEYS

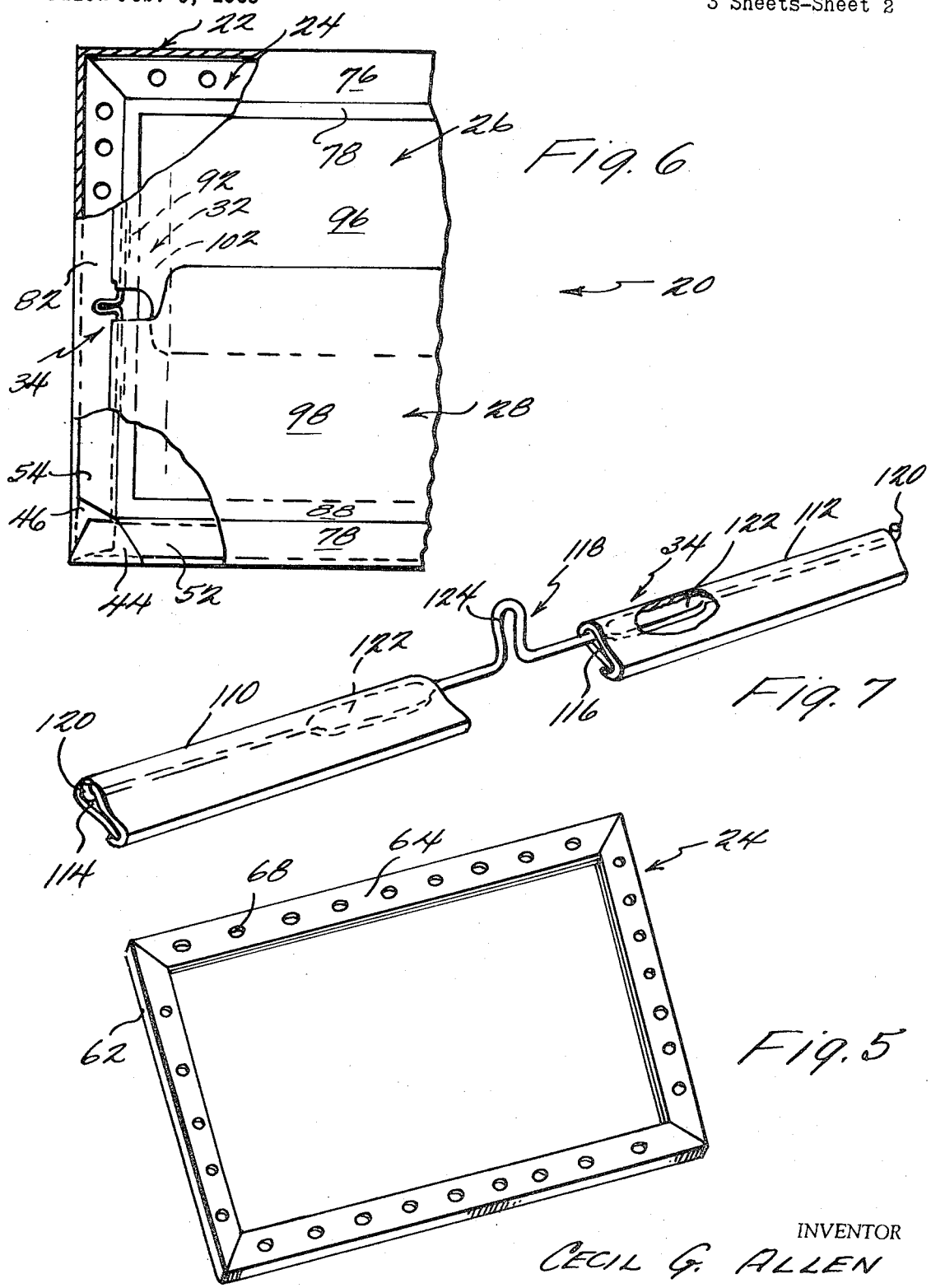

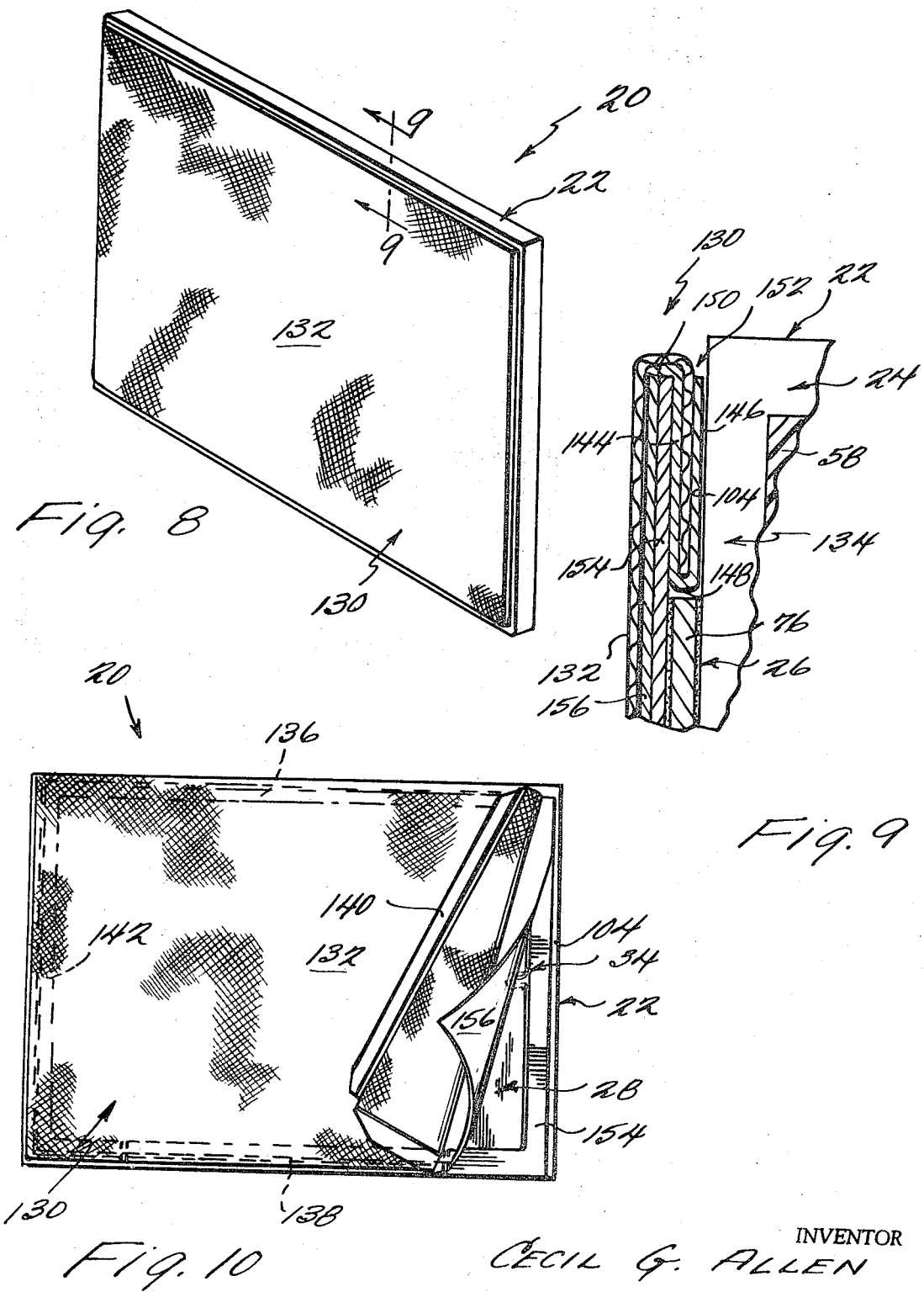

United States Patent Office 3,552,052
Patented Jan. 5, 1971

3,552,052
PICTURE FRAME
Cecil G. Allen, 1122 E. Jefferson,
Harlingen, Tex. 78550
Filed Feb. 5, 1969, Ser. No. 796,734
Int. Cl. G09f 1/12
U.S. Cl. 40—156
13 Claims

ABSTRACT OF THE DISCLOSURE

A frame for mounting and displaying pictures and the like comprising a unitary frame cover having a reinforcing member therein filled with a foam plastic and provided with two pairs of opposed retaining flaps secured to the rear face of the frame cover with one pair of flaps overlapping and being interconnected by adjustable locking clips so that pictures of varying thickness can be mounted within the frame. In addition, a detachable rear cover of stretchable material is provided for the back of the frame to cover the retaining flaps.

BRIEF DESCRIPTION OF THE INVENTION

This invention relates to picture frames and, more specifically, to an improved picture frame assembly comprising a unique combination of a frame cover, reinforcing member and means, hidden from view by a rear cover, for retaining pictures within the frame.

It is a primary object of the present invention to provide an improved frame which is long lasting, nonwarping and pleasing in appearance while at the same time being extremely economical in construction and ideally adapted to fabrication by mass production techniques.

It is a further object of the invention to provide an improved frame having a retaining means which not only securely mounts the picture within the frame but covers the entire back of the frame and picture to keep the back of the picture clean and to keep pictures on stretched canvas or other easily damaged materials from being damaged if the picture frame is accidentally leaned against sharp objects or the like.

It is a further object of the invention to provide a picture frame having a means, for retaining the picture in the frame, which will hold glass within the frame for use in front of photographs and the like.

It is yet a further object of the present invention to provide a picture frame means for mounting and displaying pictures of varying thickness wherein the retaining flaps on the rear face of the frame are provided with adjustable locking clips to permit adjustment of the flaps in accordance with the picture being inserted within the frame.

It is still a further object of the invention to provide a frame having a cover of unitary construction with no joint lines marring the forward face thereof and a cover which can easily be formed with designs thereon.

It is yet a further object of the present invention to provide a picture frame having a reinforcing member which is both easy to assemble and which permits the easy introduction of foam plastic into the member to further strengthen the frame construction.

It is a further object of the invention to provide a frame cover having flaps which overlap for extra rigidity and to keep the foam plastic of the reinforcing member from escaping before it has hardened.

It is a further object to provide a frame cover having a rounded inner edge which is formed by folds rather than exposed raw edge.

It is a further object to provide a frame, having the above-mentioned characteristics, with a rear cover so that the retaining flaps are not visible and a picture or the like mounted within the frame does not appear to be easily removable.

Briefly, the present invention comprises a unitary frame cover having score or fold lines thereon to facilitate the formation of the frame cover into its final shape and having flap portions that overlap to provide extra rigidity to the frame covering. Within the cover, a rectangular reinforcing member is housed having a substantially channel-shaped cross section and provided with apertures in its side faces through which plastic foam is introduced to strengthen the frame which is formed from the frame cover and reinforcing member. Two pairs of opposed retaining flaps are secured to the rear face of the frame cover with the upper and lower retaining flaps extending substantially more than half-way across the rear face of the frame so that they normally overlap while the lateral retaining flaps extend only part way across the rear face of the frame within the upper and lower flaps to insure that lateral movement of the picture within the frame is prevented.

The opposed upper and lower retaining flaps are interconnected by adjustable locking clips which allow the upper and lower flaps to be separated to permit the insertion of the picture into the frame or the withdrawal of a picture from the frame and which permit the adjustment of the extent of overlap of the flaps when a picture is locked in place so that pictures of various sizes or thicknesses can be retained within the frame with only a quick and easy adjustment of the upper and lower flaps being required to adapt a frame to different pictures. The clips each comprise a pair of elongated tubular members having slots extending therethrough with tapered cross sections and a rod which is received within and joins the elongated tubular members together. One tubular member of each clip is secured to the lower flap while the other tubular member is secured to the upper flap and the rod is provided with a pair of flattened portions of greater width than the rest of the rod which are slidably received within the slots of the tubular members when oriented in one position but which become wedged within the slots of the tubular members when the rod is pivoted through an angle of 90 degrees.

In addition, a detachable rear cover of a stretchable material is provided for the back of the frame to cover the retaining flaps so that the retaining flaps are not visible. The rear cover is secured to the frame by peripheral edging that is affixed to the stretchable material and received within slots formed on the rear face of the frame.

The above objects and advantages of the present invention will become more apparent and other objects and advantages of the present invention will become apparent from the following detailed description when taken in conjunction with the accompanying drawings in which:

FIG. 1 is a front perspective view of the picture frame of the present invention with a picture mounted in the frame;

FIG. 2 is a back perspective view of the picture frame with the retaining flaps spread apart for the insertion or removal of a picture;

FIG. 3 is a fragmentary sectional view of the picture frame substantially along lines 3—3 of FIG. 1 without the rear cover in place;

FIG. 4 is a plan view of the frame cover blank prior to the folding of the cover about the reinforcing member;

FIG. 5 is a perspective view of the rectangular reinforcing member which is housed within the frame cover;

FIG. 6 is a fragmentary view of the rear face of the frame with portions broken away to show the reinforcing member within a frame cover and the overlapping flaps of the frame cover;

FIG. 7 is a perspective view of one of the adjustable locking clips which join the upper and lower retaining flaps of the frame assembly;

FIG. 8 is a back perspective view of the picture frame of the present invention with the rear cover in place;

FIG. 9 is an enlarged fragmentary sectional view of the picture frame substantially along lines 9—9 of FIG. 8; and FIG. 10 is a rear view of the frame with the rear cover and a backing mat folded partially back to expose a portion of the retaining flaps.

DETAILED DESCRIPTION OF THE INVENTION

Referring now to the drawings, the picture frame assembly 20 illustrated and described constitutes a preferred embodiment of the principles of the present invention and it is to be understood that modifications and equivalents can be resorted to which fall within the scope of the invention. The picture frame assembly 20 comprises the frame cover 22 formed from a single piece of cardboard, plastic, metal foil or equivalent materials by means of pressing, cutting and folding operations as will be more fully described hereinafter. To reinforce the one-piece frame cover 22, a rectangular cardboard, plastic or metallic reinforcing member 24 is mounted in and secured to the cover to rigidify the frame. Attached to the rear face of the frame cover 22 are two pairs of retaining flaps 26, 28 and 30, 32 with overlapping flaps 26, 28 being provided with adjustable locking clips 34 to facilitate the adjustment of the retaining flaps 26, 28 relative to each other for locking a picture in place, inserting a picture into the frame assembly or removing a picture from the frame assembly. As shown, in the figures, the retaining flaps cooperate with the rear face of the frame to retain a picture or the like within the frame assembly for display.

The present invention is intended for use in the display of pictures with or without glass facings and is adapted to hold pictures of varying thicknesses as, for example, those ranging in size from a picture on a canvas board which is in the order of ¼ inch in thickness or less to a picture on a canvas stretcher frame which is in the order of ⅝ inch in thickness. The frame is of lightweight and very inexpensive construction and has a front face unmarred by any joint lines.

Referring now to FIG. 1, the picture frame assembly generally designated at 20 has a one-piece frame cover 22 and is illustrated with a picture 36 mounted within the frame for the purposes of display. As can be seen, the frame cover 22 is provided with various types of embossments or bas-relief designs, such as scrolls 38. As shown in FIG. 3, the cross sectional configuration of the frame cover when formed about the reinforcing member 24 is generally tapered from the outer periphery of the frame to the inner edge of the frame in a substantially triangular configuration.

As indicated above, the frame cover can be made from cardboard, plastic, metallic or similar materials with the material used being faced with some attractive material such as gold, bronze, or silver film. Cardboards are commercially available having such film material being provided on one surface thereof. However, if such a material is not available, it is a simple expedient to bond any one of the desired metallic films or foils to the cardboard by means of a paste or similar bonding agent. In addition, if desired, it is contemplated that the frame can be painted.

The frame cover 22 can be manufactured in the same manner disclosed in my Pat. No. 3,053,001, issued Sept. 11, 1962 and entitled "Picture Frame" (disclosure of which is incorporated herein by reference) with the sheet of cardboard or plastic material being pressed between two dies applying a force of perhaps 5,000 pounds per square inch. The dies can be provided with projections for forming score lines 40 on the rear face of the blank (see FIG. 4) to facilitate the folding of the blank along the correct lines to form the cover 22 about the reinforcing member 24 and can also be provided with cutting elements for cutting the inner and outer peripheries of the frame cover blank so that the flaps formed from the folding of the blank along the score lines will overlap in the proper manner. As best shown in FIGS. 3, 4 and 6, the tapered outer flaps 42, 44, 46 and 48 of the frame together with the tapered inner flaps 50, 52, 54 and 56 are cut so that the outer flaps overlap at the corners and the inner flaps overlap the outer flaps to give extra rigidity to the frame. The overlapping of the frame cover flaps also keeps the foam plastic 58, which is used to fill and rigidify the frame assembly, from escaping before it has had a chance to harden. In addition, since the inner flaps are folded outwardly over the outer flaps, a stronger and straighter inner edge 60 can be formed on the frame which is rounded rather than having an exposed raw edge. While the folding of the frame cover 22 along the fold lines 40 forms a frame having a triangular cross section, it is to be understood that the cross section can vary somewhat from a triangular cross section due to the formation of the frame cover about the inner reinforcing member 24 as shown in FIG. 3.

Rectangular reinforcing frame 24 is mounted within the frame cover 22. The reinforcing member is substantially channel-shaped in cross section having a web portion 62 forming the outer periphery of the reinforcing member and a pair of inwardly extending flanges 64, 66 extending inwardly from either side of the web. Inwardly-extending flanges 64, 66 have outer portions extending perpendicular to web 62 and parallel with respect to each other, converging intermediate portions and inner terminal portions in contact with each other and extending perpendicular to the web 62 along a plane coincident with the vertical center line of the frame assembly 20. Flanges 64 and 66 are provided with apertures 68 to allow the foam plastic 58 to be poured into the member to further rigidify the frame. While the apertures 68 are shown adjacent the web 62 in flange 64, it is contemplated that the apertures can be positioned anywhere along the outer and intermediate portions of either or both flanges. Of course, it is preferred to have the apertures 68 adjacent the web 62 since this is the widest part of the reinforcing member 24 and should thereby insure that the member is completely filled when the foam plastic is poured into the reinforcing member.

The reinforcing member 24 is preferably made of aluminum, tin, or any composition light metal or plastic having a thickness of approximately .005 to .007 inch. The width of the web 62 is substantially equal to the width desired for the frame assembly perimeter and the coengaging terminal portions of the flanges 64, 66 are of the width desired for the inner frame edge 60. The reinforcing member 24 can be made from a single blank which is bent into the form of a rectangle, as shown in FIG. 5, or if desired, the side and end sections can be formed from individual pieces and bonded or otherwise suitably secured together.

While various methods can be followed in assembling the frame, in one method of assembling the frame, the reinforcing frame 24 is placed on blank 22 and the blank 22 is folded along its score lines 40 part of the way about reinforcing frame 24 so as to seal off any apertures on one side of the frame and thereby prevent or minimize the seepage of plastic foam from the reinforcing member. Next, the plastic foam 58 is introduced into the reinforcing member 24 by pouring it through the apertures 68 on the upper side of the reinforcing member until the interior of the reinforcing member is filled with plastic foam. Then the folding of the frame cover 22 about the reinforcing member 24 is completed and the overlapping flaps of the cover are pasted or otherwise bonded together thereby forming the improved frame assembly 20 of the present invention. The overlapping of the cover flaps along with the construction of the reinforcing frame prevents any seepage of the plastic foam from within the frame assembly thereby forming a sturdy lightweight and aesthetically pleasing frame assembly.

Referring now to FIGS. 2, 3 and 6, retaining flaps 26, 28, 30 and 32 have peripheral securing strips 76, 78, 80 and 82, respectively, which are adhesively bonded by paste or similar means to the rear face of the frame assembly 20; intermediate portions 86, 88, 90 and 92, respectively defined by pairs of spaced-apart fold lines; and terminal portions 96, 98, 100 and 102. As can best be seen in FIG. 3, the securing strips 76, 78, 80 and 82 extend inwardly along the rear face of the frame from the outer periphery 104 to a point substantially adjacent the juncture of the inclined surface 106 and the inner terminal surface 108 of the rear face of the frame assembly. The retaining flaps have fold lines at the juncture of the securing strips with the intermediate portions of the retaining flaps so that the retaining flaps can be inclined outwardly at a desired angle from the rear face of the frame assembly along these fold lines. The flaps also have second fold lines thereon separating the intermediate portions of the retaining flaps from the terminal portions of the flaps, extending parallel to the first fold lines and spaced a desired distance from the first fold lines depending on the maximum thickness of pictures which are intended to be mounted in the frame. From the second set of fold lines, the flaps are adapted to extend substantially parallel to the rear face of the frame with the terminal portions 96, 98 of the upper and lower retaining flaps overlapping the side flaps 30, 32 and with flap 28 overlapping flap 26 when a picture or the like is in position.

As can be readily seen, since side flaps 30 and 32 are interposed between flaps 26, 28 and the picture being mounted within the frame assembly, the angle of inclination of the intermediate portions 90, 92 of the side flaps intermediate the sealing strip and the terminal portions 100, 102 of the flaps, will be dictated by the thickness of the picture and the upper and lower flaps 26, 28 which cooperate to wedge the terminal portions 100, 102 of the side flaps intermediate the picture and the upper and lower flaps. The angle of inclination of the intermediate portions 86, 88 on the upper and lower flaps 26, 28 is dictated by the width of the picture and the adjustment of the locking clips 34 which control the amount of overlap of flaps 26, 28 and thereby the angle of inclination of the intermediate portions 86, 88 with the greater the overlap the less the inclination between the intermediate porions of the retaining flaps and the picture. As can be readily seen, with very thin pictures the amount of inclination would be small and the overlap of retaining flaps 26 and 28 would be greatest. With thicker pictures, the angle of inclination of the intermediate portions of the retaining flaps would become greater approaching the perpendicular for the thickest pictures capable of being mounted within the frame assembly.

As best shown in FIGS. 2, 6 and 7, retaining flaps 26 and 28 are interconnected by means of adjustable locking clips 34 which are adhesively bonded or otherwise suitably secured within doubled-over portions of flaps 26, 28 adjacent the side edges of the flaps. Each clip 34 comprises a pair of elongated hollow members 110, 112, one of which is secured to the flap 26, the other of which is secured to flap 28. In the preferred form, the elongated hollow members 110, 112 are made from sheet metal which is folded so as to form a tapered slot 114, 116 passing longitudinally through the respective elongated member. An adjusting rod 118 is mounted within the elongated members with each end of the adjusting rod having a hook portion 120 to limit the extent of the separation between the elongated members and, therefore, flaps 26, 28 and to prevent the rod from becoming separated from either of the elongated members. The rod 118 has a pair of flattened portions 122 on either side of the intermediate portion which is provided with a loop 124 for pivoting the rod through an angle of substantially 90 degrees. The widths of the flattened portions 122 are substantially equal to or less than the width of the slots 114, 116 in one direction, but greater than the widths of the slots in the other direction. With this construction, when the rod 118 is pivoted through an angle of 90 degrees from the position shown in FIG. 7 to a second position, the flattened portions 122 of the rod become wedged within the slots 114, 116 locking the rod relative to the elongated hollow members so that there can be no sliding movement between the members and, therefore, locking the flap 26 relative to the flap 28.

As can be readily seen in FIG. 6, flaps 26 and 28 have cut-out portions adjacent their side edges so that the flaps do not overlap adjacent their side edges but only in the midportions. This permits the maximum amount of adjustment between the flaps. Of course, the side flaps 30, 32 extend in past the cut-out portions of the upper and lower flaps therefore completely covering the picture which is mounted within the frame.

Turning now to FIGS. 8 through 10, a rear cover 130 is illustrated which covers the back of frame 20 so that the retaining flaps 26, 28, 30 and 32 are not visible and a picture 36 or the like mounted within the frame does not appear readily removable. The rear cover 130 is made of a stretchable or elastic material 132, such as vinyl coated cotton, a weave fabric, rubber, latex or the like, and is provided with a peripheral edging 134 for securing the cover to the frame.

In the preferred form, the peripheral edging 134 comprises upper and lower edgings 136, 138 (each of which is made up of an intermediate section and a pair of outer sections) and lateral edgings 140, 142. The edging 134 is channel-shaped in transverse cross section with substantially parallel flanges 144, 146 being joined by a web 148 and flange 144 having an extension 150 extending outwardly from its free end at right angles. The material 132 of cover 130 is received between and affixed within flanges 144, 146 which are crimped or pressed together to compress and frictionally retain the fabric 132 therein. In addition, numerous commercially available adhesives or other suitable fastening means can be utilized to firmly affix the edges of the material 132 within the edgings 134.

As best shown in FIG. 9, extension 150 limits the insertion of edging 134 into peripheral slot 152 which is formed about the periphery of the rear face of the frame by a rectangular strip 154 of stiff cardboard or the like (that is adhesively or otherwise affixed to portions 76, 78, 80, 82 of retaining flaps 26, 28, 30, 32) and the rear face 104 of the frame. Extension 150 also keeps the stretched material 132 of cover 130, which in an unstretched condition has smaller dimensions than the outer dimensions of strip 154, from being damaged or worn by the outer edge of strip 154.

With the width of the slot 152 being substantially equal to but greater than the transverse dimensions of edging 134 and wih the cover being retained in the slot 152 by the inward forces which the stretched material 132 exerts on edgings 134 when they are in the slot 150, the sectioned upper and lower edgings 136, 138 greatly facilitate the mounting or removal of the cover 130 from the frame. As illustrated in FIG. 10, the removal of the rear cover can be initiated by merely pulling one of the outer sections of the upper or lower edgings 136, 138 from slot 150 after which the removal of the rest of the edgings becomes quite easy or the mounting of the cover on the frame can be completed by the insertion of one of the outer sections after all of the rest of the edging 134 is in place.

A backing mat 156 of cardboard or the like, having substantially the same outside dimensions as strip 154, can be inserted between cover 130 and the retaining flaps 26, 28, 30, 32. This helps to conceal any protruding portions of the retaining flaps or loop 124, the outlines of which might otherwise show through the stretched material 132.

While the preferred form of the invention has been shown and described, it is contemplated that all suitable modifications and equivalents can be resorted to which fall within the scope of the invention.

What is claimed is:

1. A frame for mounting and displaying pictures and the like comprising:

frame means having a front face and a rear face, said frame means having an opening therein; and retaining means for cooperating with said rear face of said frame means to retain a picture in said frame, said retaining means comprising at least a first pair of opposed flaps secured to said frame means, said first pair of opposed flaps overlying at least a portion of said opening, and said first pair of opposed flaps being interconnected by adjustable locking means to allow adjustment of said flaps for the proper mounting of pictures and the like in said frame.

2. In the frame of claim 1:

the frame means comprising cover means and reinforcing means mounted within said cover means.

3. In the frame of claim 2:

said reinforcing means comprising a hollow member filled with a plastic foam.

4. In the frame of claim 1:

one of said opposed flaps overlapping the other of said opposed flaps when said opposed flaps are in a closed position.

5. In the frame of claim 4:

a second pair of opposed flaps, said second pair of opposed flaps being overlapped by said first pair of opposed flaps and co-operating with said first pair of opposed flaps to retain pictures and the like within the frame.

6. In the frame of claim 1:

said opposed flaps each comprising portions which are angularly adjustable with respect to each other to accommodate pictures and the like of various thicknesses.

7. In the frame of claim 1:

said adjustable locking means comprising a pair of locking elements, said locking elements each having two hollow members with one of said members being secured to one of said first pair of opposed flaps and the other of said hollow members being secured to the other of said first pair of opposed flaps, said hollow members each being interconnected by means of a rod, said rod having means permitting relative movement between said rod and said hollow members when said rod is in a first position and for preventing relative movement between said rod and said hollow members when said rod is rotated to a second position.

8. In the frame of claim 7:

said hollow members of each of said locking elements having slots therethrough of tapered cross sections and said rod of each of said locking elements having flattened portions of greater width than the remaining portion of the rod with said flattened portion being slidably retained within said hollow members when said rods are in a first position and wedged within said hollow members when said rod is rotated to a second position.

9. A frame for mounting and displaying pictures and the like comprising:

frame cover means having a front face and a rear face, said frame cover means having an inner edge defining an opening which is enclosed by said frame cover means;

reinforcing means housed within said frame cover means, said reinforcing means having a plastic foam therein to further rigidify said frame;

retaining means for cooperating with said rear face of said frame cover means to retain a picture within said frame, said retaining means comprising first and second pairs of opposed flaps secured to said rear face if said frame means, each of said flaps having a first portion secured to said rear face of said frame means, a terminal portion adapted to extend substantially parallel to the rear face of said frame and an intermediate portion pivotally connected to the other portions to permit pictures of varying thickness to be mounted within the frame;

One of said first pair of opposed flaps overlapping the other of said first pair of opposed flaps to thereby substantially cover the entire rear face of the frame and said first pair of opposed flaps overlying said second pair of opposed flaps; and said first pair of opposed flaps being interconnected by adjustable locking means to allow adjustment of the overlap of said first pair of opposed flaps and consequently the angle of inclination between the intermediate portions of the first pair of opposed flaps and the terminal portions of the opposed flaps whereby said frame can be adapted to retain pictures of various thicknesses.

10. In the frame of claim 1:

rear cover means for covering a portion of said frame so that said retaining means is hidden from view.

11. In the frame of claim 10:

said rear cover means comprising a stretchable fabric having peripheral edgings secured thereto with said peripheral edgings being retained in slots of said frame.

12. In the frame of claim 9:

rear cover means for covering a portion of said frame so that said retaining means is hidden from view.

13. In the frame of claim 12:

said rear cover means comprising a stretchable fabric having peripheral edgings secured thereto with said peripheral edgings being retained in slots of said frame.

References Cited

UNITED STATES PATENTS

| | | | |
|---|---|---|---|
| 1,626,150 | 4/1927 | Parda | 40—156 |
| 2,784,511 | 3/1957 | Price | 40—1521 |
| 2,862,322 | 12/1958 | Ziegler | 40—154 |
| 3,053,001 | 9/1962 | Allen | 40—154 |
| 3,388,491 | 6/1968 | Spertus | 40—152 |

EUGENE R. CAPOZIO, Primary Examiner

W. J. CONTRERAS, Assistant Examiner

U.S. Cl. X.R.

40—154